US012002295B2

United States Patent
Suneja et al.

(10) Patent No.: US 12,002,295 B2
(45) Date of Patent: Jun. 4, 2024

(54) SYSTEM AND METHOD FOR VIDEO AUTHENTICATION

(71) Applicant: Accenture Global Solutions Limited, Dublin (IE)

(72) Inventors: Ankit Suneja, Pune (IN); Rajeev Divakaran Nair, Bangalore (IN); S. Abishek Kumar, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 376 days.

(21) Appl. No.: 17/401,609

(22) Filed: Aug. 13, 2021

(65) Prior Publication Data

US 2023/0058259 A1 Feb. 23, 2023

(51) Int. Cl.
| | | |
|---|---|---|
| G06V 40/40 | (2022.01) | |
| G06F 18/25 | (2023.01) | |
| G06N 20/00 | (2019.01) | |
| G06V 40/16 | (2022.01) | |
| G06V 40/70 | (2022.01) | |
| G10L 17/06 | (2013.01) | |

(52) U.S. Cl.
CPC ............ *G06V 40/45* (2022.01); *G06F 18/253* (2023.01); *G06N 20/00* (2019.01); *G06V 40/172* (2022.01); *G06V 40/70* (2022.01); *G10L 17/06* (2013.01); *G06V 40/178* (2022.01)

(58) Field of Classification Search
None
See application file for complete search history.

(56) References Cited

U.S. PATENT DOCUMENTS

| | | | |
|---|---|---|---|
| 8,189,878 B2 | 5/2012 | Schultz | |
| 8,605,956 B2 | 12/2013 | Ross et al. | |
| 9,100,825 B2 | 8/2015 | Shultz et al. | |
| 9,210,156 B1* | 12/2015 | Little | G06F 21/34 |
| 11,269,841 B1* | 3/2022 | Baker, Jr. | G06F 16/2255 |

(Continued)

FOREIGN PATENT DOCUMENTS

| | | |
|---|---|---|
| CA | 3030134 A1 | 12/2017 |
| WO | 2021055380 A1 | 3/2021 |
| WO | 2021150693 A1 | 7/2021 |

*Primary Examiner* — Michelle M Entezari Hausmann
(74) *Attorney, Agent, or Firm* — Plumsea Law Group, LLC

(57) ABSTRACT

A system and method for video authentication may apply machine learning to analyze whether a person's face captured by live video matches a face in a photo ID captured by live video and to analyze other features based on a video session with the person. For example, machine learning may be applied to analyze a set of features indicating whether the person is a real, live person (as opposed to a photo image held up over the person's face in the video, etc.). Finally, the machine learning may be applied to analyze a set of features to determine whether a lower probability prediction that the person's face captured by live video matches a face in a photo ID captured by live video should be either pass authentication (due to one or more features/circumstances mitigating the lower probability) or fail authentication (due to one or more features not mitigating the lower probability). In such a situation, the set of features may indicate that mitigating factors/conditions exist that can offset the lower probability.

16 Claims, 11 Drawing Sheets

(56) References Cited

U.S. PATENT DOCUMENTS

| | | | |
|---|---|---|---|
| 2006/0004866 A1* | 1/2006 | Lawrence | G06Q 10/0635 |
| | | | 715/255 |
| 2006/0231610 A1* | 10/2006 | Cheng | G07C 9/257 |
| | | | 235/380 |
| 2007/0198401 A1* | 8/2007 | Kunz | G06Q 40/00 |
| | | | 705/38 |
| 2009/0187553 A1* | 7/2009 | Sarkar | G06Q 30/02 |
| | | | 707/999.005 |
| 2015/0310545 A1* | 10/2015 | deOliveira | G06Q 40/02 |
| | | | 705/35 |
| 2015/0339769 A1* | 11/2015 | deOliveira | G06Q 40/03 |
| | | | 705/38 |
| 2015/0347734 A1* | 12/2015 | Beigi | H04L 9/3268 |
| | | | 726/28 |
| 2016/0217486 A1* | 7/2016 | Waters | G06Q 30/0226 |
| 2017/0132636 A1* | 5/2017 | Caldera | G06Q 20/4016 |
| 2018/0060759 A1* | 3/2018 | Chu | G06N 20/00 |
| 2018/0293488 A1* | 10/2018 | Dang | G06N 3/045 |
| 2019/0354809 A1* | 11/2019 | Ralhan | G06F 16/116 |
| 2020/0202369 A1* | 6/2020 | Datta | G06V 40/176 |
| 2020/0294528 A1* | 9/2020 | Perri | G06F 3/167 |
| 2021/0064591 A1* | 3/2021 | Sun | G06F 16/182 |
| 2021/0133492 A1* | 5/2021 | Lee | H04N 23/90 |
| 2021/0208953 A1* | 7/2021 | Vasileiadis | G06F 9/4881 |
| 2022/0131844 A1* | 4/2022 | Sherlock | H04L 63/105 |

* cited by examiner

| FACE ID MATCH MODULE | | | |
|---|---|---|---|
| FACE MATCH | | | ID MATCH |
| FACE LIVELINESS | SMART COMPARATIVE ANALYTICAL MATCH SCORE | | ID TYPE |
| AGE | | | DATA EXTRACT |
| BELOW 60 / ABOVE 60 | | | ID PHOTO PIXILATION |
| GENDER | IF/ELSE | | AUTO ZOOM |
| MALE / FEMALE / NB | | | AUTO LIGHTING |
| FACE TYPE | SMART CONDITIONAL VARIANT ADAPTIVE SCORING | | AUTO SHARPNESS |
| FACE MASK | | | AUTO ADJUST |
| FACE SEGMENT | | | FEATURE EXTRACTION |
| IMAGE QUALITY | YES | | AUTO CROP |
| FACE FEATURES | NO | | IMAGE QUALITY ASSESSMENT |
| HISTOGRAM OF ORIENTED GRADIENTS/CNN/SELF LEARNING MODEL | | | |

| LIVENESS MODULE 120 |||
|---|---|---|
| FREQUENCY & TEXTURE BASED ANALYSIS || SCENIC BASED ANALYSIS |
| VARIABLE FOCUSING BASED ANALYSIS || LIP MOVEMENT BASED ANALYSIS |
| MOVEMENT OF EYES BASED ANALYSIS || CONTEXT BASED ANALYSIS |
| OPTICAL FLOW BASED ANALYSIS || COMBINATION BASED ANALYSIS |
| EYE BLINK BASED ANALYSIS || CLASSIFICATION BASED ANALYSIS |
| COMPONENT DEPENDENT DESCRIPTOR ANALYSIS || CONDITIONAL RANDOM FIELDS MODEL |
| 3D FACE ANALYSIS || HIDDEN MARKOV MODELLING |
| YES | SMART COMPARATIVE ANALYZER | NO |
| | SMART CONDITIONAL ANALYZER | |
| VECTOR QUANTIZER / SELF LEARNING MODEL |||

FIG. 7

| VOICE ID MODULE | | |
|---|---|---|
| VOICE FREQUENCY | MEL FREQUENCY CEPSTRAL COEFFICIENTS | |
| VOICE PITCH | | |
| ACOUSTIC SIGNAL ANALYZER | LINEAR PREDICTION CEPSTRAL COEFFICIENTS | |
| LEXICAL TOKEN ANALYZER | | |
| SPECTRUM ANALYZER | SEQUENCE CONVERSION | |
| DECODER | HIDDEN MARKOV MODELLING | |
| LEXICONS | SMART COMPARATIVE ANALYZER | NO |
| PHONE MODELS | | |
| GRAMMAR NETWORK | YES | SMART CONDITIONAL ANALYZER |
| DYNAMIC TIME WARPING/ANN | | |
| VECTOR QUANTIZER / SELF LEARNING MODEL | | |

| PEP MODULE (124) | | |
|---|---|---|
| FACE MATCH | PHOTO MATCH SEARCH COMPARISON ANALYZER | |
| FACE MATCH SEGMENTATION | FACE MASK ID MATCH SEGMENTATION ANALYZER | |
| FACE ANALYZER | PAGERANK | |
| VOICE FREQUENCY | | |
| VOICE PITCH | YES | NO |
| PEP PHOTO MATCH | SMART COMPARATIVE ANALYZER | |
| LEXICAL TOKENS | SMART CONDITIONAL ANALYZER | |
| PEP DATA AGGREGATOR TOKENIZATION | | |
| VECTOR QUANTIZER / SELF LEARNING MODEL | | |

| SENTIMENT MODULE | | | |
|---|---|---|---|
| EMOTION TYPE | ACTIVE | | AROUSED |
| FACE TYPE | HIGH POWER | | CONTROL |
| FACE POSE DETECTOR | PASSIVE | | CALM |
| LIVENESS DETECTOR | CONDUCTIVE | | OBSTRUCTIVE |
| AGE / GENDER | LOW POWER | | CONTROL |
| SENTIMENT MODULATOR | PLEASANT | | UNPLEASANT |
| FACE FEATURES | POSITIVE | | NEGATIVE |
| ATTENTION ANALYZER | SMART COMPARATIVE ANALYZER | YES | NO |
| FACE ANALYZER / VALENCE | SMART CONDITIONAL ANALYZER | | |
| AROUSAL / EMOTION VARIANCE | | | |
| DATA PROCESS ENGINE / SELF LEARNING MODEL | | | |

FIG. 10

SYSTEM AND METHOD FOR VIDEO AUTHENTICATION

TECHNICAL FIELD

The present disclosure generally relates to a system and method for video authentication. More specifically, the present disclosure generally relates to machine learning based analysis of videos to authenticate user identity.

BACKGROUND

Authentication of customer identity has conventionally been accomplished in person by having the customer present their photo identity document ("photo ID") and manually comparing the customer's visual attributes to those of the presented photo. Over time, technology has advanced to where a customer's identity can be remotely authenticated by live video. However, as technology has advanced to achieve remote authentication, criminals have advanced their techniques for faking identities. For example, impersonators can cheat video authentication by placing a photo (e.g., a life-size photo) of the customer's face over the impersonator's face in the live video. In another example, impersonators create deepfakes.

There is a need in the art for a system and method that addresses the shortcomings discussed above.

SUMMARY

A system and method for video authentication is disclosed. The system and method solve the problems discussed above by applying machine learning to analyze whether a person's face captured by live video matches a face in a photo ID captured by live video and to analyze other features based on a video session with the person. For example, machine learning may be applied to analyze whether a set of features together indicate that the person's assumed identity is one triggering a heightened level of scrutiny (e.g., a person's assumed identity as a famously wealthy individual). Further, the machine learning may be applied to analyze a set of features indicating whether the person is a real, live person (as opposed to a photo image held up over the person's face in the video, etc.). Finally, the machine learning may be applied to analyze a set of features to determine whether a lower probability prediction that the person's face captured by live video matches a face in a photo ID captured by live video should be either pass authentication (due to one or more features/circumstances mitigating the lower probability) or fail authentication (due to one or more features not mitigating the lower probability). In such a situation, the set of features may indicate that mitigating factors/conditions exist that can offset the lower probability. For example, a person may have many wrinkles of their face that make it difficult to compare their face in the live video image to their face in the photo ID. In another example, a person may have faced the video camera only briefly during the session. As a result of different camera angles, the image of their face included facial features different from those present in the photo ID.

As mentioned, multiple features may be extracted and analyzed by a machine learning model during a live video session. The disclosed system and method may involve using distributed parallel model building to build machine learning models (e.g., convolutional neural network ("CNN") models) responsible for extracting and analyzing various features from the live video captured during a session. Additionally, the disclosed system and method may involve heuristic unsupervised pre-training of the models. The disclosed system and method may involve applying user moment feature fusion to provide an additional level of accuracy to predictions made by the various models. The disclosed system and method may involve applying adaptive random dropout to reduce overfitting in the training process for one or more of the machine learning models used in the authentication process.

In one aspect, the disclosure provides a computer implemented method of applying machine learning to authenticate a customer's identity via live video. The method may include receiving captured live video comprising a person's voice and images including a person's face and an image of a photo identity document ("photo ID"). The method may include processing the images through a sentiment module to generate a sentiment score based on the person's face as it appears in the live video. The method may include processing the images through a face identity document match ("face ID match") module to generate a face ID score based on the person's face as it appears in the live video. The method may include processing the images through a liveness module to generate a liveness score based on the person's face as it appears in the live video. The method may include processing the person's voice through a voice module to generate a voice score based on the person's voice as it sounds in the live video. The method may include processing the images and the person's voice through a politically exposed person ("PEP") module to generate a PEP score based on the person's face and the person's voice. The method may include, in response to determining that the PEP score is "fail" and one or both of the face ID score and the liveness score is "fail," determining whether a condition offsets the failing face ID score and/or the failing liveness score. In some embodiments, the method may include, in response to determining that a condition offsets the failing face ID score and/or the failing liveness score, verifying that the customer's identity passes authentication. In some embodiments, the method may include processing the images through a machine learning model to determine, based on the photo ID, whether the person's age is above a predetermined threshold. In some embodiments, the method may include the person's age is the condition. In some embodiments, the method may include, in response to determining that PEP score is "pass," disallowing an offset based on whether a condition offsets the score of "fail." In some embodiments, the sentiment score may include the condition. In some embodiments, the method may include in response to determining that a condition does not offset the failing face ID score and/or the failing liveness score, verifying that the customer's identity fails authentication. The method may include applying a heuristic unsupervised pre-training process to pre-train at least one of the sentiment module, the face ID match module, the liveness module, the voice module, and the PEP module. The heuristic unsupervised pre-training process may include adjusting one or more of hyperparameters of a cost function. In some embodiments, processing the images through at least one of the sentiment module, the face ID match module, the liveness module, and the PEP module includes extracting features from the images. In some embodiments, the method may include fusing user moment information with the features extracted from the images when processing the images through at least one of the sentiment module, the face ID match module, the liveness module, and the PEP module. In some embodiments, the method may include simultaneously building at least two of the sentiment module, the face ID match module, the liveness module, the voice module, and the PEP module on at least two different nodes.

The features in this paragraph may also apply to the embodiments of systems and non-transitory medium described below.

In yet another aspect, the disclosure provides a system for applying machine learning to authenticate a customer's identity via live video, comprising one or more computers and one or more storage devices storing instructions that are operable, when executed by the one or more computers, to cause the one or more computers to: (1) receive captured live video comprising a person's voice and images including a person's face and an image of a photo identity document ("photo ID"); (2) process the images through a sentiment module to generate a sentiment score based on the person's face as it appears in the live video; (3) process the images through a face identity document match ("face ID match") module to generate a face ID score based on the person's face as it appears in the live video; (4) process the images through a liveness module to generate a liveness score based on the person's face as it appears in the live video; (5) process the person's voice through a voice module to generate a voice score based on the person's voice as it sounds in the live video; (6) process the images and the person's voice through a politically exposed person ("PEP") module to generate a PEP score based on the person's face and the person's voice; and (7) in response to determining that the PEP score is "fail" and one or both of the face ID score and the liveness score is "fail," determine whether a condition offsets the failing face ID score and/or the failing liveness score.

In yet another aspect, the disclosure provides a non-transitory computer-readable medium storing software comprising instructions executable by one or more computers which, upon such execution, cause the one or more computers to apply machine learning to authenticate a customer's identity via live video by (1) receiving captured live video comprising a person's voice and images including a person's face and an image of a photo identity document ("photo ID"); (2) processing the images through a sentiment module to generate a sentiment score based on the person's face as it appears in the live video; (3) processing the images through a face identity document match ("face ID match") module to generate a face ID score based on the person's face as it appears in the live video; (4) processing the images through a liveness module to generate a liveness score based on the person's face as it appears in the live video; (4) processing the person's voice through a voice module to generate a voice score based on the person's voice as it sounds in the live video; (5) processing the images and the person's voice through a politically exposed person ("PEP") module to generate a PEP score based on the person's face and the person's voice; and (6) in response to determining that the PEP score is "fail" and one or both of the face ID score and the liveness score is "fail," determining whether a condition offsets the failing face ID score and/or the failing liveness score.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 6 shows a conceptual diagram of the face identity document match ("face ID match") module, according to an embodiment.

FIG. 7 shows a conceptual diagram of the liveness module, according to an embodiment.

FIG. 8 shows a conceptual diagram of the voice module, according to an embodiment.

FIG. 9 shows a conceptual diagram of the politically exposed person ("PEP") module, according to an embodiment.

FIG. 10 shows a conceptual diagram of the sentiment module, according to an embodiment.

DESCRIPTION OF EMBODIMENTS

Figure 1:
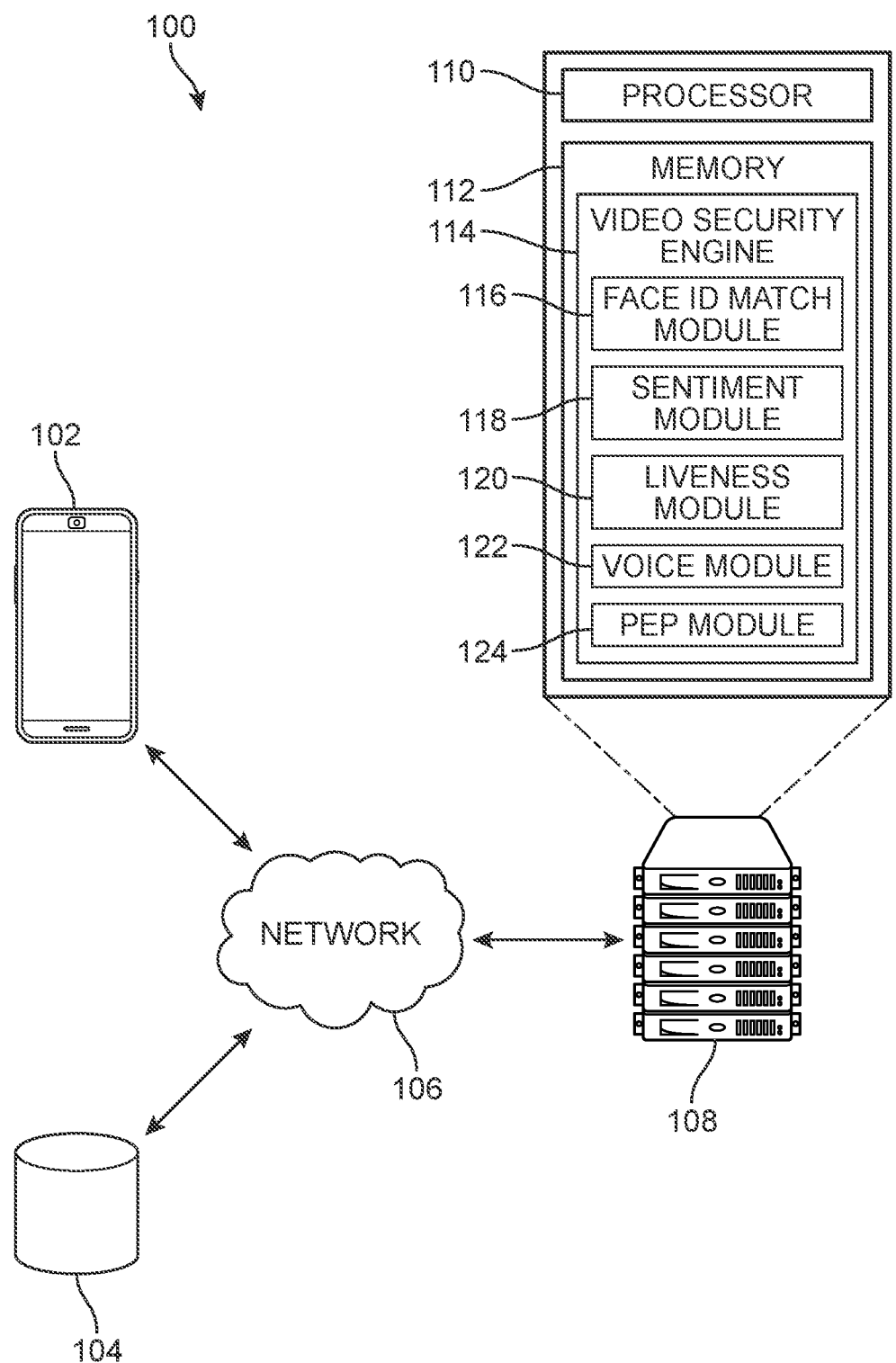
FIG. 1 is a system for authenticating a customer's identity, according to an embodiment.

FIG. 1 is a schematic diagram of a system for video authentication 100 (or system 100), according to an embodiment. The disclosed system may include a plurality of components capable of performing the disclosed method of video authentication (e.g., method 200). For example, system 100 includes a user device 102, a computing system 108, and a database 104. The components of system 100 can communicate with each other through a network 106. For example, user device 102 may retrieve information from database 104 via network 106. In some embodiments, network 106 may be a wide area network ("WAN"), e.g., the Internet. In other embodiments, network 106 may be a local area network ("LAN").

As shown in FIG. 1, video security engine 114 may be hosted in computing system 108, which may have a memory 112 and a processor 110. Processor 110 may include a single device processor located on a single device, or it may include multiple device processors located on one or more physical devices. Memory 112 may include any type of storage, which may be physically located on one physical device, or on multiple physical devices. In some cases, computing system 108 may comprise one or more servers that are used to host security engine 114.

While FIG. 1 shows one user device, it is understood that one or more user devices may be used. For example, in some embodiments, the system may include two or three user devices. The user may include an individual seeking to have their identification authenticated (e.g., for securely interacting with a bank, insurance company, or other business) by live video. In some embodiments, the user device may be a computing device used by a user. For example, user device 102 may include a smartphone or a tablet computer. In other examples, user device 102 may include a laptop computer, a desktop computer, and/or another type of computing device. The user devices may be used for inputting, processing, and displaying information. In some embodiments, a digital camera may be used to generate live video images used for analysis in the disclosed method. In some embodiments, the user device may include a digital camera that is separate from the computing device. In other embodiments, the user device may include a digital camera that is integral with the computing device, such as a camera on a smartphone, laptop, or tablet.

Referring to FIG. 1, system 100 may further include a database 104, which stores training data and/or live data captured by device 102. This data may be retrieved by other components for system 100.

As discussed in more detail below, video security engine 114 may include a face identity document match ("face ID match") module 116, a sentiment module 118, a liveness module 120, a voice module 122, and a politically exposed person ("PEP") module 124. Each of these modules may be used to analyze parameters contributing to video authentication. The method may include conducting a video session in which a user presents their face and a photo identity document ("photo ID") to a video camera (e.g., digital camera on a tablet, laptop, or smartphone). In some embodiments, the user may be prompted to present their face to a video camera at the same time as the user presents their photo ID to the camera. In some embodiments, the user may be prompted to present their face to a video camera at a different point in the session from when they are prompted to present their photo ID to the camera.

The face ID match module 116 may process live video images of a user's face and live video images of the user's photo ID to determine a photo ID score indicating whether the user's live face matches the user's photo ID face. Sentiment module 118 may process live video images of the user's face to determine a sentiment score based on the user's facial movements. Liveness module 120 may process live video images of the user's face to determine a liveness score based on various liveness indicators. Voice module 122 may be used to process audio sounds (e.g., user's voice) captured in the live video to determine a voice score indicating whether the voice captured by live video is a sufficient sample for comparing to PEP voice data. PEP module 124 may process live video images of the user's face, the face and information on the photo ID, and/or audio sounds (e.g., user's voice) captured in the live video to determine whether the user is a PEP (e.g., famously wealthy individual, such as a celebrity or mogul). As discussed in more detail below the scores generated by the individual modules may be used to make a final determination as to whether or not the user's identity has been authenticated.

During practice, a user may interact with the system in a video session to authenticate the user's identification. Generally, a session may involve the user presenting their face and a photo ID to a camera. In some embodiments, the user may be asked to perform various acts, such as adjusting the view presented to the camera, the user's position with respect to the camera, and/or answering questions (e.g., verbally, by typing, and/or by interacting with a screen on the device).

The disclosed system and method of video authentication may include running through a series of tests or checks to ensure that the video of the user and photo ID are unobstructed and/or the conditions of the video are ideal for accurate identification of the user appearing the in the video. For example, the tests may include detecting whether or not the person in the live video is wearing a face mask. In some cases, if a mask is detected, the person may be prompted to remove the mask. In another example, the tests may include detecting whether more than one person appears in the live video. In some cases, if more than one person is detected, the user may be prompted to adjust the view of the video camera to remove the excess people from the view. Additionally, during the session, the location of the user may be detected by detecting the location of the device (e.g., using geolocation). This way, the location the user gives and/or the location listed on the user's photo ID may be compared with the location of the device. This information may be used to verify the user's actual location. The conditions detected through the series of test or checks during the live video session may contribute to the quality of the video authentication and may, therefore, be considered in the final determination of whether a person's identity has been authenticated or not.

In some cases, the video is obstructed, or the conditions are not ideal for accurately identifying the user because of certain circumstances. For example, one condition may be that a person is not facing the camera head-on. However, the requirements of this particular condition may be relaxed because the user is over 60. In such a case, the process of authenticating this customer's identity will adjust for the way the user is facing the camera.

Figure 2:
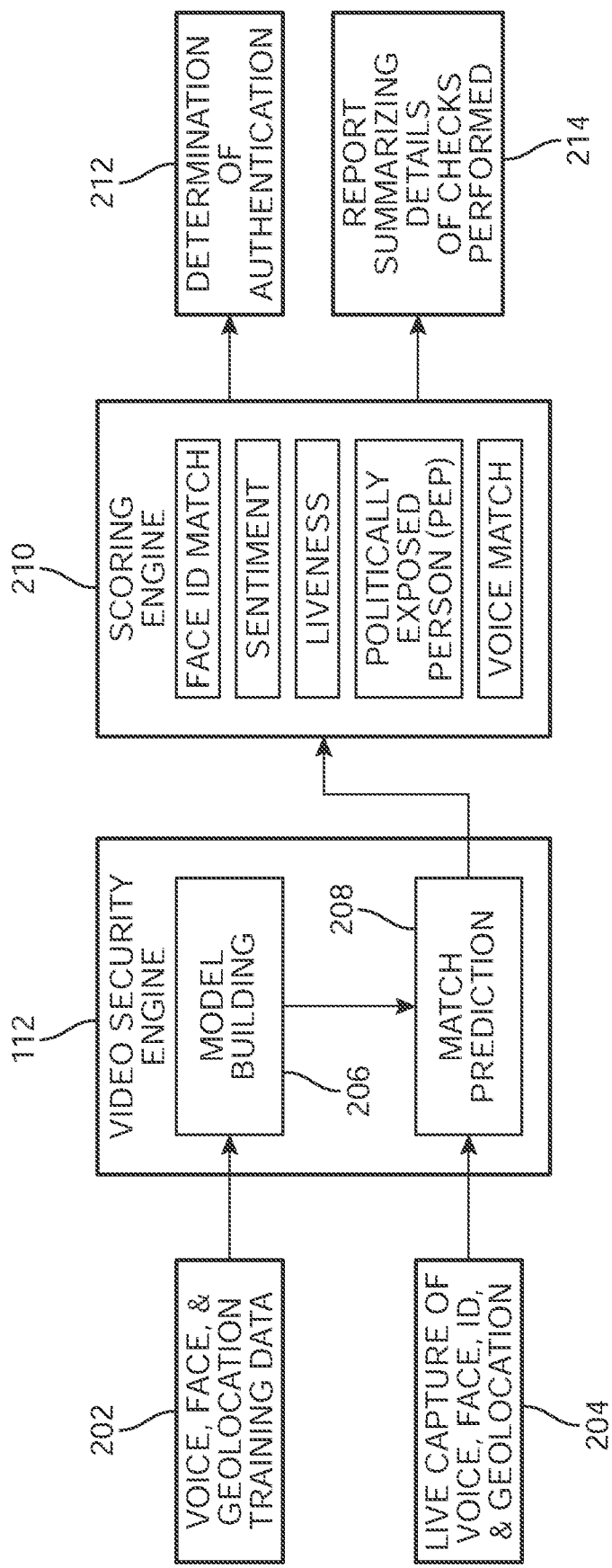
FIG. 2 shows the basic flow of video authentication, according to an embodiment.

FIG. 2 shows the basic flow of video authentication. As discussed in more detail below, distributed parallel model building may be employed to build multiple models each analyzing different parameters/features from a video session with a user. For example, the parameters/features may include face ID match, sentiment, liveness, voice, and PEP each analyzed respectively by a face ID match module, a sentiment module, a liveness module, a voice module, and a PEP module. The inputs for model building 206 may include one or more of voice, face, and geolocation training data 202. Model building, pre-training, and training may include various techniques discussed in more detail below. For example, the method of video authentication may include heuristic unsupervised pre-training the multiple models to more efficiently capture important features. In another example, the method may include user moment feature fusion to improve accuracy in predictions. In yet example, the method may include applying adaptive random dropout to reduce overfitting in the training process for one or more of the machine learning models used in the authentication process.

Once the models are built, predictions may be made at 208 based on input of live capture of one or more of voice, face, ID, and geolocation 204. As detailed below, these inputs may be processed through a scoring engine 210 to calculate scores for face ID match, sentiment, liveness, voice, and PEP. These scores may be used to determine whether a user's identity has been authenticated. The output of the video authentication may include the final determination of whether a user's identity has been authenticated 212. In some embodiments, as shown in FIG. 2, the output may also include a report 214 summarizing details of checks performed.

Figure 3:
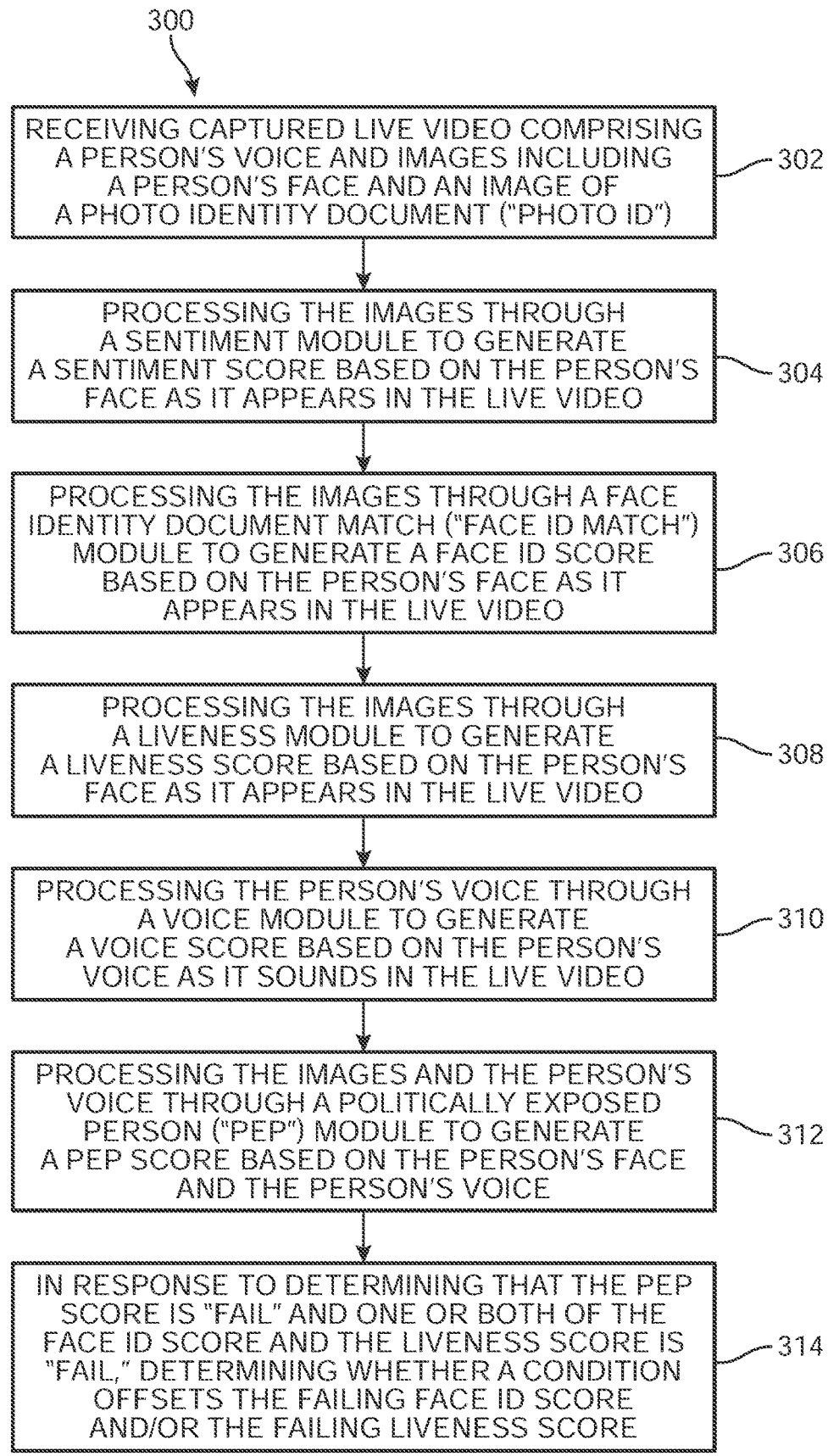
FIG. 3 shows a method of authenticating a customer's identity, according to an embodiment.

FIG. 3 shows a method of authenticating a customer's identity 300 (or method 300), according to an embodiment. In some embodiments, the method may include receiving captured live video comprising a person's voice and images including a person's face and/or body and an image of a photo ID (operation 302). For example, as discussed above, a live video session may include a user presenting their face and a photo ID to the video camera, as well as speaking into the video camera microphone. The person's voice and images including a person's face and an image of a photo identity document may be input into the video security engine and processed by modules of the video security engine. For example, the method may further include processing the images through a sentiment module to generate a sentiment score based on the person's face as it appears in the live video (operation 304). The method may further include processing the images through a face ID match module to generate a face ID score based on the person's face as it appears in the live video (operation 306). The method may further include processing the images through a liveness module to generate a liveness score based on the person's face as it appears in the live video (operation 308). In some embodiments, the live video may also capture the person's body, and the person's body and/or background surrounding the person's body may be analyzed to detect liveness. The method may further include processing the person's voice through a voice module to generate a voice score based on the person's voice as it sounds in the live video (operation 310). The method may further include processing the images and the person's voice through a politically exposed person ("PEP") module to generate a PEP score based on the person's face and the person's voice (operation 312).

The method may further include, in response to determining that the PEP score is "fail" and one or both of the face ID score and the liveness score is "fail," determining whether a condition offsets the failing face ID score and/or the failing liveness score (operation 314). The method may include, in response to determining that a condition offsets the failing face ID score and/or the failing liveness score, verifying that the customer's identity passes authentication. The method may include, in response to determining that PEP score is "pass," disallowing an offset based on whether one of the sentiment score or the person's age offsets the score of "fail."

The method may further include processing the images through a machine learning model to determine, based on the photo ID, whether the person's age is above a predetermined threshold. In some embodiments, the condition may include the person's age. In some embodiments, the condition may include the sentiment score. In some embodiments, the method may include, in response to determining that PEP score is "pass," disallowing an offset based on whether a condition offsets the score of "fail." The method may further include, in response to determining that a condition does not offset the failing face ID score and/or the failing liveness score, verifying that the customer's identity fails authentication.

FIG. 6 shows a conceptual diagram of the face ID match module 116, according to an embodiment. The face ID match score may be a score based on comparing a person's face as it appears in a live video with a photo ID presented during the live video to determine if the person's face matches the face in the photo ID. This matching is the centerpiece of video authentication, as this is the test that best determines whether a person is who they say they are in this setting. However, since a person could try to cheat the video authentication (e.g., placing a life-size photo over the person's face or wearing a mask in the video), other features (e.g., liveness) are analyzed by the disclosed method, as described below.

As previously mentioned, during a video session, a user presents their face and a photo ID to a video camera (e.g., digital camera on a tablet, laptop, or smartphone). While the user may be prompted to present their face to a video camera at the same time as the user presents their photo ID to the camera, the user may also be prompted to present their face to a video camera at a different point in the session from when they are prompted to present their photo ID to the camera. Either way, the system may perform the method by analyzing whether the person's face as it appears in a live video matches the face in the photo ID presented during the live video.

Processing the images through a face ID match module to generate a face ID match score based on the person's face may include analyzing multiple features. The face ID match module may include a machine learning model (e.g., self-learning model) configured to perform this function. In some embodiments, the face ID match module may include a CNN configured to extract and analyze features from the person's face captured in the live video session.

As part of preprocessing before comparing the person's face as it appears in a live video with a photo ID presented during the live video, the image of the photo ID shown in the live video may undergo an automatic image quality assessment to ensure that the visibility of the photo and text in the image of the photo ID is sufficient for accurate comparison. In response to determining that the visibility is insufficient, the image of the photo ID may be automatically enhanced to ensure accurate comparison. For example, the lighting of the image of the photo ID may be automatically adjusted (e.g., lightened or darkened) to enhance the visibility of the photo in the photo ID or the text/information listed on the photo ID.

In another example, the image may be automatically enlarged (i.e., zoomed in) such that the details of the photo ID are visible. In yet another example, the image of the photo ID may be automatically cropped to focus on the portion of the photo ID necessary for comparison to the person's face in the live video. In yet another example, the sharpness and/or pixilation of the image of the photo ID may be automatically adjusted to enhance the visibility of the photo in the photo ID or the text/information listed on the photo ID. In yet another example, other features of the image of the photo ID (e.g., contrast, color balance, etc.) may be automatically adjusted to enhance the visibility of the photo in the photo ID or the text/information listed on the photo ID. Feature extraction may be automatically performed to extract features from the photo in the photo ID. Information from the text in the photo ID may be automatically extracted. For example, in some embodiments, the type of ID may be extracted from the text on the photo ID. In another example, the personal details (e.g., name, birthdate, account number, address) listed on the photo ID may be extracted. In some embodiments, the information from the text in the photo ID may be automatically extracted by natural language processing (NPL) with deep learning.

Various determinations may be made when calculating the score for face ID match. For example, in some embodiments, the person's face as it appears in the live video may be analyzed to determine whether the person's expression changes, which can indicate face liveness. In some embodiments, the person's face as it appears in the live video may be analyzed to determine the age of the person (e.g., the exact age, an age range, or even simply an age threshold, such as above or below 60 years-old) may be determined. The person's face as it appears in the live video may be analyzed to determine the gender of the person (e.g., male, female, nonbinary). Features may be automatically extracted from the image of the person's face appearing the live video. Examples of features may include face type, face mask, and face segment. The person's face as it is captured in the live video session may analyzed (e.g., by a machine learning model, such as a CNN model) to determine whether the person in the live video is wearing a mask. The mask may be any type of mask. For example, the type of mask may include a medical/surgical mask, a Halloween mask, and/or a prosthetic mask. Even if the person is wearing a mask, the machine learning model can still compare the features of the person showing around the mask to the photo ID presented during the live video session.

The image of the person's face shown in the live video may undergo an automatic image quality assessment to ensure that the visibility of the person's face is sufficient for accurate comparison. In some embodiments, the person may be asked to adjust the positioning of the camera (e.g., move camera closer to face) or the location of their face (e.g. move to better light source).

The face ID match module may include histogram of oriented gradients ("HOG"), support vector machine ("SVM"), and CNN architecture. For example, SVM-based face recognition using a HOG technique may be used to detect a person's face appearing in the live video. In some embodiments, processing the images through a face identity document match ("face ID match") module may include generating 3-dimensional face map may be made of the person's face as it appears in the live video session and/or the person's face as it appears in the photo ID presented during the live video session. The 3-dimensional faces map may be compared with one another and/or 3-dimensional face maps of politically exposed people. In some embodiments, 2-dimensional face maps may be used in place of 3-dimensional face maps. Instead of or in addition to SVM-based face recognition with a HOG technique, a CNN may be used to determine whether the detected face matches the face on the photo ID presented in the live video. The face ID match module may include a self-learning model. The face ID match module may include a smart comparative analyzer and a smart conditional analyzer each configured to determine an output of yes or no.

FIG. 7 shows a conceptual diagram of the liveness module 118, according to an embodiment. Processing the images through a liveness module to generate a liveness score based on the person's face may include analyzing multiple features. The liveness module may include a machine learning model (e.g., self-learning model) configured to perform this function. In some embodiments, the liveness module may include a CNN configured to extract and analyze features from the person's face and/or body captured in the live video session.

Detecting liveness includes detecting characteristics indicating that a live video image is that of a living person. One way liveness can be verified is by determining whether the person in the video is moving relative to the background behind them. Another way of detecting liveness may include determining whether a person's face is moving into different facial expressions. Other examples of analysis performed when detecting liveness in the disclosed method may include the following: frequency and texture based analysis; variable focusing based analysis; movement of eyes based analysis; optical flow based analysis; eye blink based analysis; scenic based analysis (e.g., background moves with respect to person); lip movement based analysis; context based analysis; combination based analysis; classification based analysis; component dependent descriptor analysis; and 3-dimensional face analysis. The liveness ID match module may include a machine learning model. For example, the liveness ID match module may include a self-learning model, hidden Markov model, deep CNN, and/or conditional random fields model. The liveness ID match module may include a smart comparative analyzer and a smart conditional analyzer each configured to determine an output of yes or no. In some embodiments, the liveness module may include cascaded boosting. In some embodiments, the liveness module may include a data processing engine. In addition to being considered individually, liveness is a factor in the face ID and sentiment analyses/scoring.

FIG. 8 shows a conceptual diagram of the voice module 122, according to an embodiment. Processing the images and the person's voice through a voice module to generate a voice score based on the person's voice as it is captured in the live video may include analyzing multiple features. The voice module may include a machine learning model (e.g., self-learning model) configured to perform this function. In some embodiments, the voice module may include a CNN configured to extract and analyze features from the person's voice captured in the live video session. In some embodiments, a vector quantizer may be used in addition to or in place of a CNN.

Examples of parameters analyzed when analyzing the user's voice in the disclosed method may include the following: voice frequency, voice pitch, acoustic signal, lexical token, spectrum, lexicon. The following may be utilized when analyzing the user's voice in the disclosed method: phone models, grammar network, dynamic time warping (DTW), Mel-frequency cepstral coefficient ("MFCC"), and linear prediction cepstral coefficients. Dynamic time warping (DTW) may include finding an optimal assignment path. Acoustic preprocessing may be performed prior to DTW. DTW may include recognizing connected words. MFCC features represent phonemes (distinct units of sound) as the shape of the vocal tract (which is responsible for sound generation) is manifest in them. The vocal tract may include the tongue, teeth, etc. The shape of the focal tract determines what sound comes out. The shape of the vocal tract manifests itself in the envelope of the short time power spectrum, and the job of MFCCs is to accurately represent this envelope. The voice module may include a smart comparative analyzer and a smart conditional analyzer each configured to determine an output of yes or no.

FIG. 9 shows a conceptual diagram of the PEP module 124, according to an embodiment. Processing the images and the person's voice through a PEP module to generate a PEP score based on the person's face and the person's voice may include analyzing multiple features. The PEP module may include a machine learning model (e.g., self-learning model) configured to perform this function. In some embodiments, the PEP module may include a CNN configured to extract and analyze features from the person's face, the person's voice, and/or data (e.g., text and/or graphic data) from the photo ID captured in the live video session. This analysis may also include performing the following: a face match, face mask segmentation, face analysis, voice frequency analysis, voice pitch analysis, and PEP photo match. The person's face as it is captured in the live video session may analyzed (e.g., by a machine learning model, such as a CNN model) to determine whether the person in the live video is wearing a mask. The mask may be any type of mask. For example, the type of mask may include a medical/surgical mask, a Halloween mask, and/or a prosthetic mask. Even if the person is wearing a mask, the machine learning model can still compare the features of the person showing around the mask to a photo of a PEP. In some embodiments, processing the person's voice through the PEP model may include comparing the voice captured in the live video with recordings of politically exposed persons.

Images, data, 3-dimensional maps, and/or features therefrom of politically exposed people may be stored for the purpose of comparison with the same captured and/or extracted from the photo ID and/or person's image and voice captured in the live video session. In some embodiments, processing the images through the PEP model may be performed by comparing the faces in the video (i.e., both the person's "live" face and face in the photo ID presented in a live video session) to an image or a 3-dimensional map of a PEP. In some embodiments, processing the images through the PEP model may include comparing the person's image and the image of the photo ID captured in the live video with images and/or data of politically exposed persons. In some embodiments, the photo ID as it appears in the live video may be processed through a machine learning model to determine if the name listed on the photo ID is that of a PEP by comparing the name on the photo ID with names of politically exposed people. In some embodiments, the PEP module may include a fuzzy logic analyzer. Lexical tokens may be applied during the processing of the images and person's voice through the PEP module. A PEP data aggregator tokenization may be employed as part of processing the images and the person's voice through a PEP module to generate a PEP score.

Politically exposed persons are higher targets for fakes and, therefore, require a higher level of scrutiny. In other words, because detection of a PEP can be linked to a higher likelihood of a user faking an identity, detection of a PEP should trigger a higher level of scrutiny in the identification verification process. For example, a poor match between the photo ID and the person's face displayed in the live video will not be offset by the predicted age of the person in the live video if a PEP is detected by the PEP module (i.e., PEP check passes). Because of the higher likelihood of a fake identity, a flag may be raised when a person's image in the live video matches a photo of a PEP and/or a person's voice in the live video matches a voice sample of a PEP.

PageRank is a technique for determining the importance of data relative to a set of data. PageRank may be used to match a person's live video image with an image (or images) of a PEP. Similarly, PageRank may be used to match a person's live video voice with a PEP's voice (e.g., comparing the live video voice with audio sample(s) of a PEP's voice).

The PEP module may include a smart comparative analyzer and a smart conditional analyzer each configured to determine an output of yes or no.

FIG. 10 shows a conceptual diagram of the sentiment module 118, according to an embodiment. Processing the images through a sentiment module to generate a sentiment score based on the person's face may include analyzing multiple features. The sentiment module may include a machine learning model (e.g., self-learning model) configured to perform this function. In some embodiments, the sentiment module may include a CNN configured to extract and analyze features from the person's face captured in the live video session.

Determining the sentiment of the person in the live video session can provide helpful insight to the video authentication process. Sentiment may be gleaned from facial expressions. Thus, sentiment may be determined by analyzing a person's facial expressions. If a person is constantly changing their facial expressions and/or is contorting their face into widely dynamic expressions, the person's face in the live video may be difficult to match to the face in the photo ID.

The sentiment module may include a machine learning model (e.g., self-learning model) configured to process the images captured in the live video session to generate a sentiment score based on the person's face as it appears in the live video. In some embodiments, the sentiment module may include a data processing engine.

Sentiment can also be analyzed to determine an average sentiment, a mean sentiment, or a sentiment at a certain point in the video session. This information can help with customer relations and business analytics used for interacting with customers or advertisement.

As shown in FIG. 10, many factors may be analyzed in determining sentiment. For example, emotion type, face type, face pose, and liveness may be analyzed. For example, emotional characteristics, such as arousal or valence may be considered when determining sentiment. Age and gender may be considered in analyzing sentiment. The sentiment module may further include a sentiment modulator, an attention analyzer, and a face analyzer. In some embodiments, the following projected states may be considered in determining sentiment: active, aroused, high power, control, passive, calm, conductive, obstructive, low power, control, pleasant, unpleasant, positive, and negative. The sentiment module may include a smart comparative analyzer and a smart conditional analyzer each configured to determine an output of yes or no.

To ensure privacy, data is encrypted, and the images captured and analyzed during a video session are stored in a temporary cache during usage and then is deleted immediately following usage.

The disclosed system and method may include machine learning induction scoring as part of video authentication. As discussed above with respect to the embodiment of FIG. 3, the scores generated by each module may be considered in the determination of whether or not a user's identity is authenticated. In some embodiments, the modules may output a score of either "pass" or "fail". These scores may be based on thresholds of probabilities. For example, a score of "pass" for the face ID match could be anything above a threshold of 97% match. In other examples, the threshold may be set at 94% match or 96% match.

Multiple scenarios may lead to a final determination that a user's identity has been authenticated. Likewise, multiple scenarios may lead to the final determination that a user's identity has not been authenticated. Below Table 1 shows examples of scenarios discussed below:

TABLE 1

Exemplary Scenarios

| Scenario | Face ID match | Liveness | Voice | Sentiment | PEP | Within offset range? | Offset condition exists? | Final score |
|---|---|---|---|---|---|---|---|---|
| 1 | Pass | Pass | Fail | Fail | Fail | N/A | N/A | Pass |
| 2 | Fail | Pass | Pass | Pass | Fail | N/A | N/A | Fail |
| 3 | Pass | Fail | Pass | Pass | Fail | N/A | N/A | Fail |
| 4 | Fail | Pass | Pass | Pass | Fail | Yes | Yes | Pass |
| 5 | Fail | Pass | Pass | Pass | Fail | Yes | No | Fail |
| 6 | Pass | Fail | Pass | Pass | Fail | Yes | Yes | Pass |
| 7 | Pass | Fail | Pass | Pass | Fail | Yes | No | Fail |

As previously mentioned, the face ID match score is the centerpiece of authentication. Similarly, liveness is required for authentication. In scenario 1, because the face ID match module and liveness module both calculate a score of "pass" the scores calculated in the other modules have less importance. Thus, this scenario results in a final score of "pass" for user authentication. In other passing scenarios not shown, the face ID match score and liveness score are both "pass", and the other scores may be in any combination of "pass" and "fail." This is because the passing of face ID match and liveness indicates that a live person's image was captured in the video session and that the live person's face matched that of the photo ID.

If the face ID match score is "fail", but the probability of a match between the video face and the photo ID face is within a predetermined range (e.g., between 80% and 96%), this "fail" for the face ID match score may be offset by other factors/conditions discovered during analysis (e.g., age of user is above 60 years old, or user was not facing the camera through much of the video). The predetermined range can be set between a minimum and the percentage just below the threshold for "pass." The range may be selected as one that would normally fail but is close enough to pass that mitigating conditions may boost the score up to pass. Similar to the scenario previously mentioned, if the liveness match score is "fail", but the probability of the person in the video being live is within a predetermined range (e.g., between 80% and 96%), this "fail" for the liveness score may be offset by other factors/conditions discovered during analysis (e.g., age of user is above 60 years old, or user was not facing the camera through much of the video). These factors/conditions may be determined during analysis performed by any of the described modules.

Scenarios 2-5 demonstrate how the predetermined range and offset conditions can contribute to the final score. In scenario 2, the face ID match score is "fail" and the other component scores (besides PEP) are "pass." Because the score of "fail" is not within the predetermined offset range, the "fail" is not offset and the final score is "fail."

In scenario 3, the liveness score is "fail" and the other component scores (besides PEP) are "pass." Because the score of "fail" is not within the predetermined offset range, the "fail" is not offset and the final score is "fail."

In scenario 4, the face ID match score is "fail" and the other component scores (besides PEP) are "pass." Because the score of "fail" is within the predetermined offset range, the "fail" is eligible for offset. Because an offset condition exists the final score is "pass."

In scenario 5, the face ID match score is "fail" and the other component scores (besides PEP) are "pass." Because the score of "fail" is within the predetermined offset range, the "fail" is eligible for offset. Because an offset condition does not exist the final score is "fail."

In scenario 6, the liveness score is "fail" and the other component scores (besides PEP) are "pass." Because the score of "fail" is within the predetermined offset range, the "fail" is eligible for offset. Because an offset condition exists the final score is "pass."

In scenario 7, the liveness score is "fail" and the other component scores (besides PEP) are "pass." Because the score of "fail" is within the predetermined offset range, the "fail" is eligible for offset. Because an offset condition does not exist the final score is "fail."

In the case that the PEP score was "fail", no change would be made to the analysis. However, if the PEP score was "pass", an alert may be disseminated and/or the scrutiny of the analysis may be raised. For example, the threshold for "pass" may be raised for one or more components (e.g., face ID match, liveness, etc.).

As previously mentioned with respect to FIG. 2, the output of the system may include whether a user's identity has been authenticated and a report summarizing details of checks performed. For example, a message may be sent to a person (e.g., bank associate) interacting with the user. The message may announce that the user's identity has been authenticated (or not authenticated) and may provide a report summarizing details of checks performed. For example, the report may list the scores of "pass" or "fail" for voice, sentiment, liveness, face ID match, and PEP. The report may also list whether the geolocation of the user, the aggregated video forensic check, face mask, and 3-dimensional face map have a score of "pass" or "fail", as well as the probability associated with the aggregated accuracy level (e.g., 99.6%). The report may further list facts extracted by the component modules during the video session (e.g., location detected, name of the customer/user, ID type (e.g., passport or driver's license), ID document number (e.g., passport number or driver's license number), status as existing customer (e.g., "yes" or "no"), bank account number, and customer sentiment (e.g., satisfied or not satisfied).

As mentioned, the disclosed system and method may involve using distributed parallel model building to build machine learning models responsible for extracting and analyzing various features from the live video captured during a session. Additionally, the disclosed system and method may involve heuristic unsupervised pre-training of the models. The disclosed system and method may involve applying user moment feature fusion to provide an additional level of accuracy to predictions made by the various models. The disclosed system and method may involve applying adaptive random dropout to reduce overfitting in the training process for one or more of the machine learning models used in the authentication process.

Industries like banking or insurance, in which the customers identity are highly segmented (e.g., regarding facial features, gender, face mask presence, sentiment, etc.), benefit from segment-specific models to support sophisticated customer identification decisions. Additionally, identifying and/or matching images of highly segmented customers can benefit from training many identity specific models at the same time. In some embodiments, the disclosed system and method utilizes a distributed parallel model building paradigm that can train multiple machine learning models (e.g., deep CNN models) simultaneously with high scalability. The distributed parallel model building paradigm is highly scalable, as its capacity of model building can be dynamically adjusted simply by configuring the number of computation nodes. In some embodiments, the distributed parallel model building paradigm may be used to simultaneously build the models of the face ID match module, sentiment module, liveness module, voice module, and PEP module.

Conventional deep model building process is a single sequence task. All the epochs as well as the mini-batches contained in epochs usually run on one node. In contrast, the disclosed system and method may include distributed parallel model building involving simultaneously building individual models that can be dispatched to various nodes as transaction packages. In other words, distributed parallel model building allows the training processes to be divided into dispatchable building transactions, which can be dispatched among nodes. For example, the system and method may include simultaneously building at least two of the sentiment module, the face ID match module, the liveness module, the voice module, and the PEP module on at least two different nodes.

Figure 4:
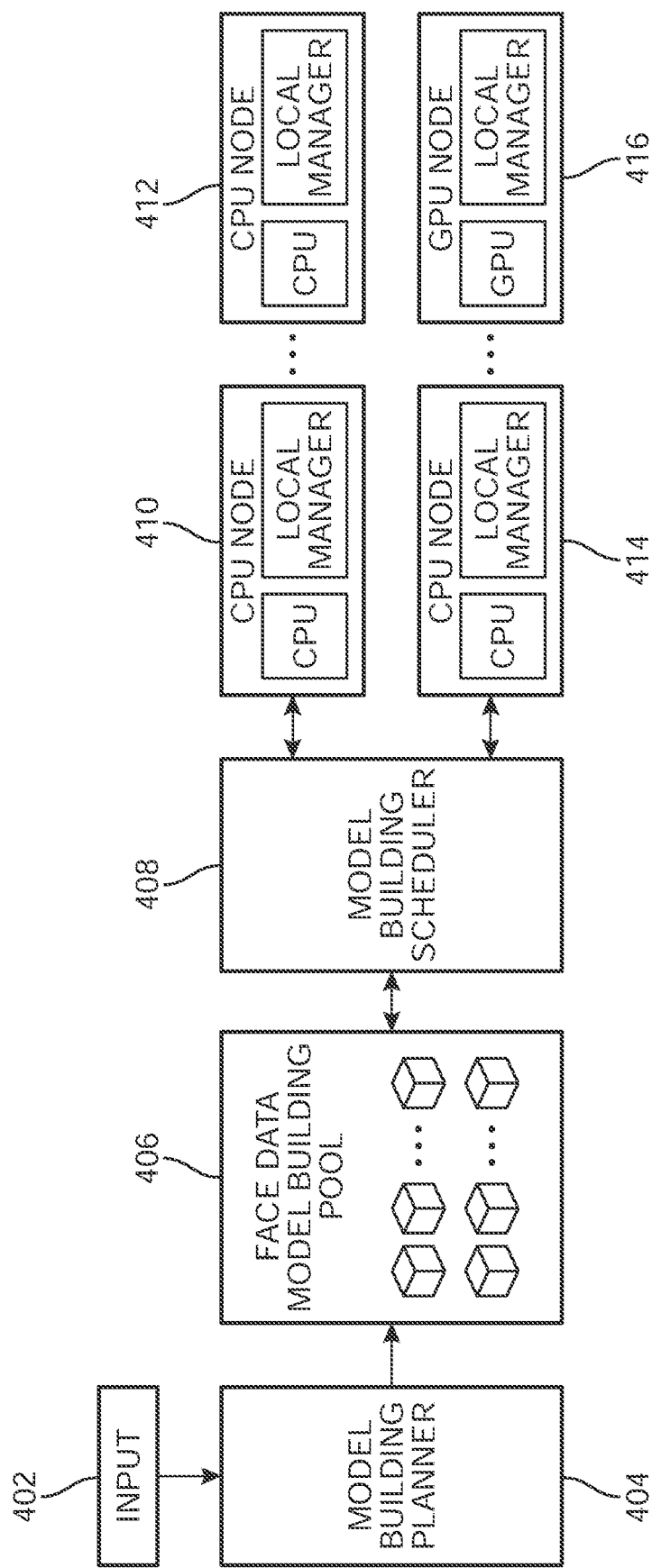
FIG. 4 show distributed parallel model building, according to an embodiment.

FIG. 4 shows distributed parallel model building, according to an embodiment. In some embodiments, as shown in FIG. 4, the disclosed system may include a distributed parallel model building system containing at least the following modules: a model building planner 404, a model building scheduler 408, and, on each node, a local manager. For example, FIG. 4 shows multiple nodes including first CPU node 410, second CPU node 412, third CPU node 414, and fourth CPU node 416. It is understood that the dotted lines between the nodes indicate that the distributed parallel model building system may be scaled up to include more nodes.

During the process of distributed parallel model building, input 402 (e.g., face data or a dataset) may be fed to model building planner 404. The model building planner may create dispatchable transaction packages (e.g., at face data model building pool 406). In other words, one model building task may be divided up into multiple dispatchable transactions that can be shared amongst multiple computation nodes. The model building scheduler may dynamically coordinate the training progress among the computation nodes. The local manager on each node may monitor and control the local training process. All these modules may run on a parallel big data platform.

The planner can prepare the dispatchable transactions based on the dataset and market segment information. The maximum parallel level may be $N_M \times N_E$, where $N_M$ is the number of models to train, while $N_E$ is the number of epochs for one training task). The scheduler can balance the building loads among the computation nodes, so that the entire progress can be completed in a most efficient way. The local manager can monitor the status and communicate with the scheduler (e.g., to pass the status to the scheduler). Each node can be either a central processing unit (CPU) or graphics processing unit (GPU) computer instance, with appropriate memory area to cache the training transaction packages, which are needed in the model building process.

The model building transaction protocol of having protocol support network communication between central training scheduler and local training managers may provide technical benefits. For example, a high level of compatibility may be enabled because heterogeneous computation nodes, which are based on CPU or GPU architectures, or run on different operating systems, or use different machine learning packages, can be simultaneously managed with applying this protocol. This provides high scalability and saves great configuration efforts for large scale model building work. Another benefit is fine management granularity. The entire model building process may be divided into much finer model building transactions. This provides manageable features for progress monitoring and task progress backup and restore, which are especially valuable for large scale model building tasks.

The model building transaction protocol of having protocol support network communication between central training scheduler and local training managers may be utilized for multiple machine learning usages because this communication supports any type of deep machine learning, including deep learning and other conventional machine learning tasks such as SVM, Random Forest, Logistic Regression, etc. Additionally, this communication may be leveraged in multiple applications. For example, this communication may be used for model building for general business/industry applications.

Distributed parallel model building may support multiple learning schemes. For example, a number of deep learning schemes may be combined and managed by the local training manager. The training manager may tune the learning configuration parameters with the consideration of the balance between model validation performance and training time spent. This tuning may be used, for example, with constant learning rate, a momentum learning scheme, Nesterov accelerated gradient, Adagrad, and/or Adadelta. In some embodiments, the best scheme may be selected because the most applicable deep learning schemes may be integrated into the video security engine. This provides convenience for choosing an appropriate scheme for specific model building tasks.

One of the critical issues in deep learning is how to efficiently find the global optima of the neurons' weights. In the disclosed system, a heuristic unsupervised pre-training scheme can solve this issue.

Heuristic unsupervised pre-training, which may be used to pre-train the various machine learning models of the disclosed system and method, captures important features and does so more efficiently. Heuristic unsupervised pre-training may include the following: starting the training session; initializing neuron-weights with random values, pre-training the deep CNN model unsupervised; training the deep CNN model supervised; validating the model and checking performance; and completing the current session. Feature maps are trained after unsupervised pre-training in this process.

The conventional process results in moderate to relatively low accuracy performance. The heuristic unsupervised pre-training process results in high accuracy performance.

The heuristic unsupervised pre-training process may be performed using a stacked encoder-decoder approach. This process can force the feature maps to learn important features from unlabeled data. One auxiliary decoder neuron layer may be created for each neuron of the model. Divergence between the input and the decoded data may be analyzed and used to guide the pre-training process. The heuristic cost function captures both absolute difference (mean squared error (MSE)) and distribution difference (Kullback-Leibler (KL) divergence). Hyperparameters ($\alpha$, $\theta$) of the heuristic cost function help fine-tuning this process.

For a multilayer CNN, the pre-training may be done in layer-wise (stacked) fashion. The next layer may be pre-trained just after the pre-training of the previous layer.

Heuristic unsupervised pre-training may involve the following formulas in which the variables represent scores of various capture type representations, such as image, voice, and face ID captured via camera. The encoding function for forward convolution is as follows:

$$y_{i,f}^k = \sigma\left(\sum_{i,f} w_{i,f} x_{i,f} + b\right)$$

The decoding function for reverse convolution is as follows:

$$z_{i,f}^k = \sigma\left(\sum_{i,f} \hat{w}_{i,f} x_{i,f} + \hat{b}\right)$$

The heuristic cost function is as follows:

$$f_{divergence} = \alpha\left[\theta\left(\frac{1}{n}\sum_{k,j} \|z_{i,j} - x_{i,j}\|\right) + (1-\theta)\left(\sum_T p_x(t) \log \frac{p_x(t)}{p_z(t)}\right)\right],$$

where $$\theta\left(\frac{1}{n}\sum_{k,j} \|z_{i,j} - x_{i,j}\|\right)$$

is absolute difference $$\left(\sum_T p_x(t) \log \frac{p_x(t)}{p_z(t)}\right)$$

is distribution difference, α is scale weight, and θ is balance weight. These formulas for unsupervised pre-training may define the cost calculation for unsupervised pre-training. This enables automatic processing for the general purpose of deep CNN model building with the consideration of the factors of both absolute difference and distribution difference. These formulas enable unsupervised pre-training that can be performed without considering specific characteristics of the dataset. The hyperparameters of the formula enable fine tuning that can improve accuracy of the outcome. For example, one or more of the hyperparameters of the formula may be adjusted (i.e., increased or decreased in value) to fine tune the outcome accordingly.

As mentioned, the disclosed system and method may involve applying user moment feature fusion to provide an additional level of accuracy to predictions made by the various models (e.g., models used by the face match ID module, liveness module, PEP module, sentiment module, and voice module). User moment feature fusion considers the context of a user's circumstances.

Certain customer characteristics can depend on specific status and context of the user (known as "moments"). Moments are different from user attributes (i.e., gender, ages, etc. used to define customer segments). Incorporating such information can further improve prediction accuracy in machine learning models (e.g., models used to authenticate user identity).

Rating (e.g., such as a customer review) is a complex decision-making process. Using moment information can better explain how the detailed user status and context influence rating results. Variables of moment information are usually categorical. The flexibility of the structure of the CNN makes it possible to well incorporate such data. The CNN may use customer segment specific models. For example, the segment specific models may be based on demographic dimensions (e.g., age, gender, etc.) and geo-location dimensions (e.g., countries, cities, etc.).

Figure 5A:
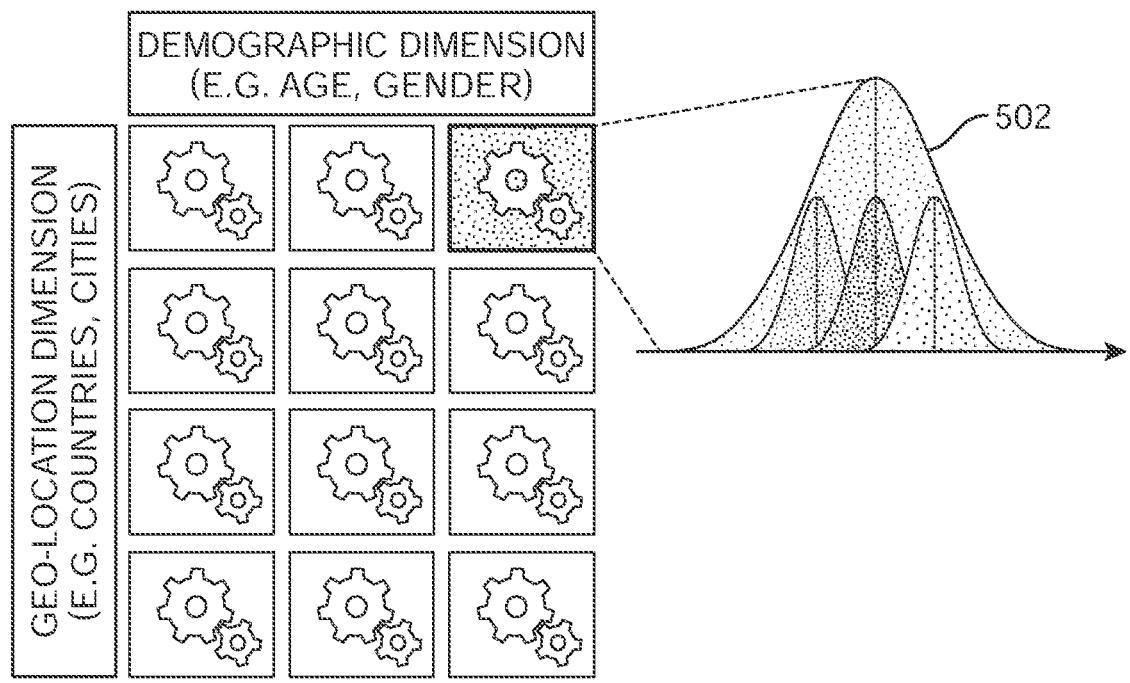
FIGS. 5A and 5B show the differences between a prediction without moment information and a prediction with moment information, according to an embodiment.
Figure 5B:
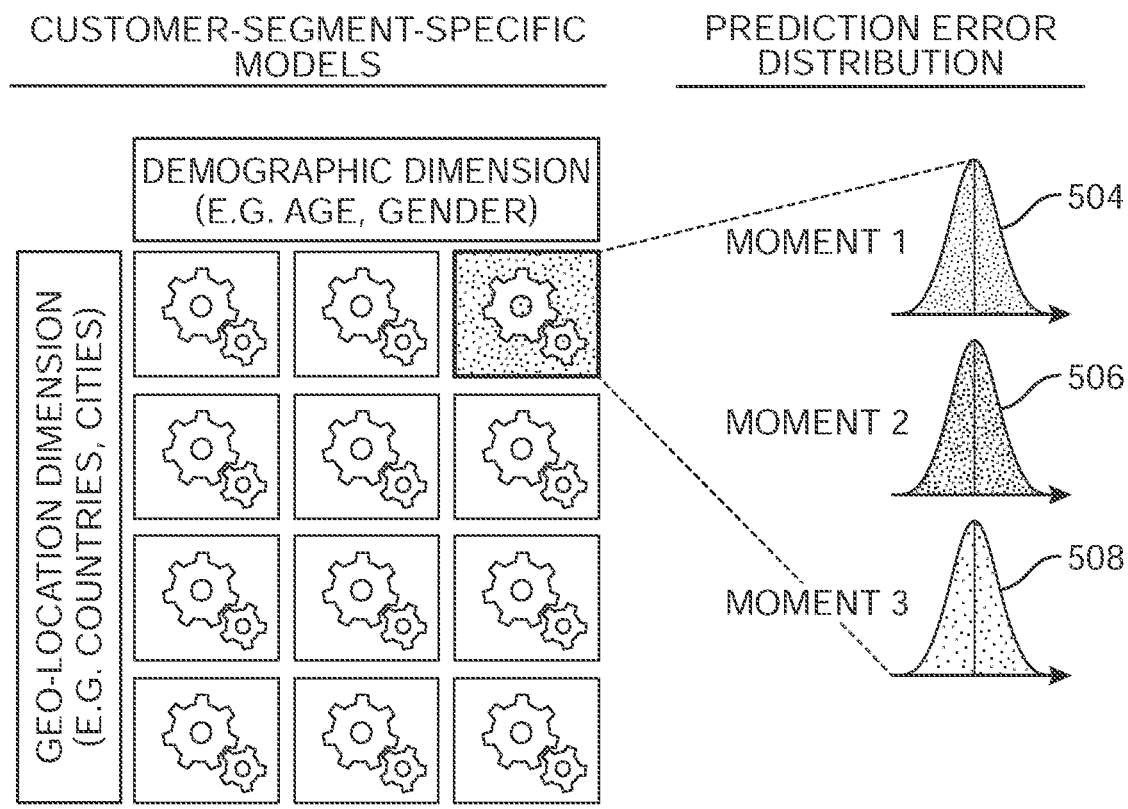

FIGS. 5A and 5B show the differences between a prediction without moment information and a prediction with moment information, according to an embodiment. As shown in FIG. 5A, in a prediction without moment information, error distributions corresponding to different moments are mixed at 502 without identifying the corresponding moments. Thus, the final prediction errors are distributed in a wide range. By contrast, as shown in FIG. 5B, a prediction with moment information results in a narrower range of error distribution for each individual moment at 504, 506, 508.

User moments may be defined on the basis of domain knowledge and practices. For inbound customer identification, examples of moments include stage moments, such as "before travel", "during travel", "after travel", etc. Examples of moments include time moments, such as weekdays, events, seasons, etc. Examples of moments include activity moments, such as buying, viewing, eating, playing, staying, etc. User moment information may first be mapped to a set of categorical variables. A converter module may convert the categorical moment variables into dummy numbers. Dummy moment variables may be organized as an additional vector, which may then be fused with unified features converted from the input image. In other words, the features extracted from the image may be combined with the dummy moment features.

User status context relevant to purchase stage, behavioral time, and activity types may be captured by using moment features, which may be fused into model building in order to improve the model performance. Capturing moment features may improve performance by capturing factors considered to influence user decision process of ratings or purchases.

In some embodiments, processing the images through at least one of the sentiment module, the face ID match module, the liveness module, and the PEP module may include extracting features from the images. In some embodiments, the disclosed system and method may include fusing user moment information with the features extracted from the images when processing the images through at least one of the sentiment module, the face ID match module, the liveness module, and the PEP module. This fusing may be performed in the manner discussed above.

The system and method may include applying adaptive random dropout to reduce overfitting in the training process for one or more of the machine learning models used in the authentication process. Overfitting happens when the model wrongly learns noises or trivial information, rather than useful general knowledge. Deep learning applications are more vulnerable to this issue, since the number of neurons is usually very large (e.g. millions). When training dataset is too small, iterative multi-epoch training could cause "hard-links" among some specific neurons that can only learn trivial information.

Random dropout may be applied to invalidate a portion of neurons with a predetermined ratio at each training step, consequently cutting of "hard-links" and reducing overfitting. When applying dropout, overfitting is substantially reduced even using relatively small training data. A tradeoff effect for this reduction is that the learning ability of the CNN model may be weakened to some degree.

As part of adaptive overfitting reduction, both training and validation costs may be computed simultaneously after each training step and the difference between the two may be used as an indicator of overfitting. For example, a larger difference may imply that the model has a high risk of overfitting. The training-validation difference may be calculated by the following equation:

$$d_{r-v} = |\text{cost}_{training} - \text{cost}_{validation}|$$

A hyperparameter can be applied to control the strength of random dropout. If the detected overfitting level is high, then the strength of the random dropout may be increased with the hyperparameter. Otherwise, the hyperparameter may be kept at the same value or may be decreased. Measuring and comparing overfitting indicators in the manner discussed above does not require specific domain knowledge of the input data. Hyperparameters may be subjected to capture data classified image and capture streams which can provide match strength of varied decoded formats of images provided using machine learning models. The strength adaption may be calculated by the following:

$$S = a_0 + a_1 d_{r-v} + a_2 d'_{r-v},$$

where $a_0$, $a_1$, $a_2$ are coefficients of bias, difference, and change rate of difference, respectively. The random dropout mask may be calculated by the following:

$$M \sim P(S),$$

where P(S) is a random kernel function, e.g., a Bernoulli distribution B(1, S). During training and validation, the dropout mask may be applied on the feature maps, as follows:

$$\widehat{x_{ij}} = X_{ij} * M_{ij}$$

Bits of the mask with the values of zeros implies the dropouts of neurons at the same positions.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computer implemented method of applying machine learning to authenticate a customer's identity via live video, comprising:
building convolutional neural network ("CNN") models for at least two of a sentiment module, a face identity document match ("face ID match"), a liveness module, a voice module, and a politically exposed person ("PEP") module on at least two different computation nodes by:
receiving, at a model building planner, module data;
creating, by the model building planner, dispatchable transaction packages at a module data building pool;
sharing the dispatchable transaction packages with the at least two computation nodes; and
dynamically coordinating, by a model building scheduler, training progress among the at least two computation nodes;
receiving captured live video comprising a person's voice and images including a person's face and an image of a photo identity document ("photo ID");
processing the images through the sentiment module to generate a sentiment score based on the person's face as it appears in the live video;
processing the images through the face ID match module to generate a face ID score based on the person's face as it appears in the live video;
processing the images through the liveness module to generate a liveness score based on the person's face as it appears in the live video;
processing the person's voice through the voice module to generate a voice score based on the person's voice as it sounds in the live video;
processing the images and the person's voice through the PEP module to generate a PEP score based on the person's face and the person's voice; and
in response to determining that one or both of the face ID score and the liveness score is "fail," determining whether a condition offsets the failing face ID score and/or the failing liveness score;
processing the images through a machine learning model to determine, based on the photo ID, whether the person's age is above a predetermined threshold, wherein the person's age is determined to be above the predetermined threshold and the person's age is the condition; and
in response to determining that PEP score is "pass," disallowing an offset based on whether a condition offsets the score of "fail."

2. The method of claim 1, further comprising:
in response to determining that a condition offsets the failing face ID score and/or the failing liveness score, verifying that the customer's identity passes authentication.

3. The method of claim 1, wherein the sentiment score is the condition.

4. The method of claim 1, further comprising:
in response to determining that a condition does not offset the failing face ID score and/or the failing liveness score, verifying that the customer's identity fails authentication.

5. The method of claim 1, further comprising:
pre-training at least one of the CNN models of the sentiment module, the face ID match module, the liveness module, the voice module, and the PEP module by a heuristic unsupervised pre-training process including:
starting a training session;
initializing neuron weights with random values;
pre-training the CNN model unsupervised;
training the CNN model supervised;
validating the CNN model;
testing performance of the CNN model; and
completing the training session.

6. The method of claim 1, wherein processing the images through at least one of the sentiment module, the face ID match module, the liveness module, and the PEP module includes extracting features from the images and wherein the method further comprises:
fusing user moment information with the features extracted from the images when processing the images through at least one of the sentiment module, the face ID match module, the liveness module, and the PEP module.

7. The method of claim 1, further comprising:
simultaneously building the at least two of the sentiment module, the face ID match module, the liveness module, the voice module, and the PEP module on the at least two different computation nodes.

8. The method of claim 1, further comprising monitoring and controlling local processes of the at least two computation nodes by local managers on the at least two computation nodes.

9. The method of claim 1, further comprising creating an auxiliary decoder neuron layer for each neuron of the respective CNN model.

10. A system for applying machine learning to authenticate a customer's identity via live video, comprising:
one or more computers and one or more storage devices storing instructions that are operable, when executed by the one or more computers, to cause the one or more computers to:
build convolutional neural network ("CNN") models for at least two of a sentiment module, a face identity document match ("face ID match"), a liveness module, a voice module, and a politically exposed person ("PEP") module on at least two different computation nodes by:
receiving, at a model building planner, module data;
creating, by the model building planner, dispatchable transaction packages at a module data building pool;
sharing the dispatchable transaction packages with the at least two computation nodes; and
dynamically coordinating, by a model building scheduler, training progress among the at least two computation nodes;
receive captured live video comprising a person's voice and images including a person's face and an image of a photo identity document ("photo ID");
process the images through the sentiment module to generate a sentiment score based on the person's face as it appears in the live video;
process the images through the face ID match module to generate a face ID score based on the person's face as it appears in the live video;
process the images through the liveness module to generate a liveness score based on the person's face as it appears in the live video;
process the person's voice through the voice module to generate a voice score based on the person's voice as it sounds in the live video;
process the images and the person's voice through the PEP module to generate a PEP score based on the person's face and the person's voice; and
in response to determining that one or both of the face ID score and the liveness score is "fail," determine whether a condition offsets the failing face ID score and/or the failing liveness score;
process the images through a machine learning model to determine, based on the photo ID, whether the person's age is above a predetermined threshold, wherein the person's age is determined to be above the predetermined threshold and the person's age is the condition; and
in response to determining that PEP score is "pass," disallow an offset based on whether a condition offsets the score of "fail."

11. The system of claim 10, further comprising:
in response to determining that a condition offsets the failing face ID score and/or the failing liveness score, verify that the customer's identity passes authentication.

12. The system of claim 10, wherein causing the one or more computers to apply machine learning to authenticate a customer's identity via live video further includes:
simultaneously building the at least two of the sentiment module, the face ID match module, the liveness module, the voice module, and the PEP module on the at least two different computation nodes.

13. A non-transitory computer-readable medium storing software comprising instructions executable by one or more computers which, upon such execution, cause the one or more computers to apply machine learning to authenticate a customer's identity via live video by:
building convolutional neural network ("CNN") models for at least two of a sentiment module, a face identity document match ("face ID match"), a liveness module, a voice module, and a politically exposed person ("PEP") module on at least two different computation nodes by:
receiving, at a model building planner, module data;
creating, by the model building planner, dispatchable transaction packages at a module data building pool;
sharing the dispatchable transaction packages with the at least two computation nodes; and
dynamically coordinating, by a model building scheduler, training progress among the at least two computation nodes;
receiving captured live video comprising a person's voice and images including a person's face and an image of a photo identity document ("photo ID");
processing the images through the sentiment module to generate a sentiment score based on the person's face as it appears in the live video;
processing the images through the face ID match module to generate a face ID score based on the person's face as it appears in the live video;
processing the images through the liveness module to generate a liveness score based on the person's face as it appears in the live video;
processing the person's voice through the voice module to generate a voice score based on the person's voice as it sounds in the live video;
processing the images and the person's voice through the PEP module to generate a PEP score based on the person's face and the person's voice; and
in response to determining that one or both of the face ID score and the liveness score is "fail," determining whether a condition offsets the failing face ID score and/or the failing liveness score;
processing the images through a machine learning model to determine, based on the photo ID, whether the person's age is above a predetermined threshold, wherein the person's age is determined to be above the predetermined threshold and the person's age is the condition; and
in response to determining that PEP score is "pass," disallowing an offset based on whether a condition offsets the score of "fail."

14. The non-transitory computer-readable medium of claim 13, wherein causing the one or more computers to apply machine learning to authenticate a customer's identity via live video further includes:

in response to determining that a condition offsets the failing face ID score and/or the failing liveness score, verifying that the customer's identity passes authentication.

15. The non-transitory computer-readable medium of claim 13, wherein causing the one or more computers to apply machine learning to authenticate a customer's identity via live video further includes:
   simultaneously building the at least two of the sentiment module, the face ID match module, the liveness module, the voice module, and the PEP module on the at least two different computation nodes.

16. The non-transitory computer-readable medium of claim 13, wherein processing the images through at least one of the sentiment module, the face ID match module, the liveness module, and the PEP module includes extracting features from the images and wherein causing the one or more computers to apply machine learning to authenticate a customer's identity via live video further includes:
   fusing user moment information with the features extracted from the images when processing the images through at least one of the sentiment module, the face ID match module, the liveness module, and the PEP module.

* * * * *